Patented Aug. 21, 1945

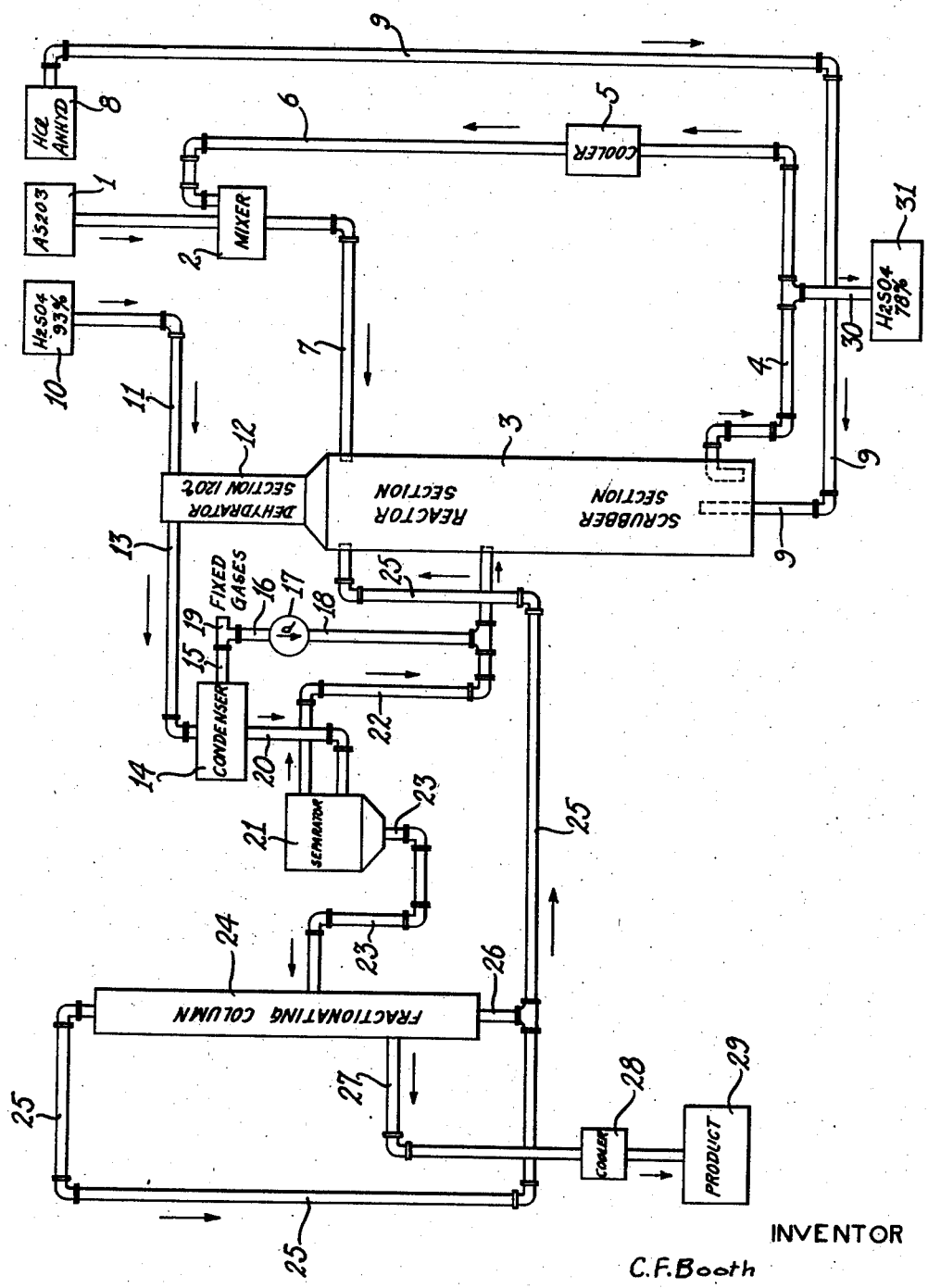

2,383,105

UNITED STATES PATENT OFFICE 2,383,105

PROCESS FOR MAKING ARSENIC CHLORIDE

Charles F. Booth, Anniston, Ala., assignor to Monsanto Chemical Company, a corporation of Delaware Application December 14, 1942, Serial No. 468,911

14 Claims. (Cl. 23—98)

This invention provides a method for producing arsenic trichloride in pure form.

I have found that arsenous oxide dissolved or slurried in sulfuric acid may be quantitatively reacted to form arsenic trichloride, $AsCl_3$ by treatment with gaseous HCl. I have also discovered that when a particular range of concentration of sulfuric acid is employed as a solvent or dispersing medium for arsenous oxide and anhydrous HCl led into such a mixture that the heat of reaction is sufficient to raise the temperature thereof to a point sufficiently high to volatilize arsenic trichloride without the volatilization of objectionably large quantities of water vapor. Since arsenic trichloride is readily hydrolyzable, objectionable quantities of water vapor are those quantities which are sufficient to effect a material hydrolysis of arsenic chloride to arsenous oxide and hydrochloric acid.

This invention, based upon the above discoveries, provides a continuous process for producing arsenic trichloride in an especially pure form and in a substantially anhydrous state by means of the reaction between arsenous oxide $As_2O_3$ and HCl.

The reaction taking place is believed to be that described by the following equation:

$$As_2O_3 + 6HCl = 2AsCl_3 + 3H_2O + heat$$

When the reaction described above is carried out in sulfuric acid of concentration as herein disclosed, the water vapor liberated combines with and hence serves to dilute the sulfuric acid constituting the liquid medium for the reaction. However, in spite of the dilution of the acid the temperature may be controlled so that relatively only small amounts of water vapor are liberated with the volatilized arsenic chloride.

The reactions comprising the process may be carried out in relatively simple equipment in a continuous manner and are effected substantially as follows: The essential reactions of the process are preferably carried out in a packed column in which the arsenic compound is carried as a solution or slurry in sulfuric acid flowing downwardly through the column and gaseous HCl passes counter-current thereto. White arsenic, the starting material for the process, is first slurried in a sulfuric acid solution having a concentration in the neighborhood of 78% $H_2SO_4$. This slurry is made so as to contain between 6% and 10% and preferably from 7% to 8% of $As_2O_3$. The slurry is prepared by intimately grinding or by otherwise mixing powdered white arsenic with the sulfuric acid so as to produce a flowable slurry which may be continuously flowed into the reactor section of the column. Anhydrous hydrogen chloride is introduced into the lower or scrubber section of the column at a rate such as to provide approximately a 10% excess of HCl over that called for by the reaction given above. The hydrogen chloride passes upwardly through the scrubber counter-current to the sulfuric acid slurry and into the reactor section of the column and therein reacts with the white arsenic carried by the acid to produce arsenic trichloride at the same time liberating heat. The temperature herein is controlled by varying the temperature of the acid used to produce the slurry described above or by varying the concentration of $As_2O_3$ in said slurry. The temperature is normally maintained at such a point so as to substantially completely remove all of the arsenic as the trichloride from the sulfuric acid before the latter is exhausted from the scrubber section of the apparatus.

The arsenic chloride liberated in the reactor section passes upwardly into a dehydrator section which is maintained at a temperature sufficiently high to maintain the arsenic trichloride in the vapor state and preferably in the neighborhood of 120° C. A supply of concentrated sulfuric acid of concentration higher than that utilized for the production of the slurry is supplied to the dehydrator section. An acid of about 93% has been found to be satisfactory for the dehydration of the arsenic trichloride in this section. Acids of higher strength, e. g., 100% or even oleum may also be employed. This acid flows through the dehydrator section into the reactor section, then down into the scrubber section and is finally discharged from the column after having been diluted somewhat by the water liberated in the reaction. Dilution by the reaction water, and by water accidentally present in the $As_2O_3$ and HCl decreases the concentration of the acid to approximately 78% which is the concentration of the acid employed to produce the starting slurry.

The arsenic chloride formed and volatilized in the reactor chamber and partially dried in the dehydrator section is thereafter condensed by contact with cooled surfaces and produces liquid arsenic trichloride mixed with a relatively small amount of aqueous HCl solution. Such a wet mixture has been found to separate into two layers, namely, an aqueous HCl layer and a substantially anhydrous arsenic trichloride layer.

The two layers produced as above are separated by mechanical means into an aqueous layer which may be either discarded or again treated in the reactor section of the apparatus and a substantially anhydrous arsenic trichloride layer. The latter layer contains the entire product and should be fractionated in a column to remove first a low boiling fraction, then a substantially pure arsenic trichloride fraction and finally a high boiling fraction. Both the low boiling and the high boiling fractions may be reprocessed in the apparatus for recovery of any contained hydrogen chloride and arsenic compounds.

The drawing forming a part of this application contains a diagrammatic flow sheet which illustrates one embodiment of my process and the preferred operation thereof will now be described. The quantities of materials employed in this example are those which I have found as satisfactory for the production of 100 lbs. of high purity arsenic trichloride as the finished product of the process. However, other proportions and concentrations may be employed within the stoichiometry of the process.

A source of white arsenic marked 1 on the diagram is mixed with 78% $H_2SO_4$ in the mixer 2 in the proportions of 55.2 lbs. of white arsenic to 700 lbs. of 78% $H_2SO_4$. The sulfuric acid for the production of the slurry being the dilute acid from the process is obtained from the lower part of the packed column 3 by means of pipe 4, cooler 5 and pipe 6. The slurry produced in mixer 2 flows by means of pipe 7 into the upper part of column 3. Since in the preferred operation the reactions taking place in the packed column generate a temperature of from 140° C. to 150° C. the acid leaving the column at this temperature is cooled by means of cooler 5 down to a temperature of approximately 110° C.

A source of anhydrous hydrogen chloride free of chlorine is indicated at 8 and is caused to flow through pipe 9 into the lower or scrubber section of the packed column 3, wherein it meets and reacts with the arsenous oxide dissolved in the sulfuric acid comprising the slurry. The anhydrous HCl gas is supplied at the rate of 60.8 lbs. per 100 lbs. of finished product.

To the top of the packed column is supplied a stream of 93% sulfuric acid solution from source 10 which acid then flows by pipe 11 into the upper part of the packed column which constitutes the dehydrator section and which may conveniently be of a somewhat reduced cross-section with respect to the main body of the packed column. Volatilized arsenic trichloride formed in the reactor section passes into and through the dehydrator section 12 where the temperature is in the neighborhood of 120° C. Water vapor which has been volatilized together with the $AsCl_3$ is to a considerable extent removed by the sulfuric acid in this section. The rate of addition of sulfuric acid of 93% concentration should be approximately 77.6 lbs. per 100 lbs. of finished product.

Volatilized arsenic trichloride which has been more or less completely dehydrated by contact with the strong sulfuric acid in dehydrator section 12 leaves section 12 by means of pipe 13 and enters a water cooled condenser 14 in which condenser substantially all of the volatile products with the exception of the 10% excess HCl and small amounts of fixed gases are condensed to a liquid. The non-condensable gases are discharged from condenser 14 by pipe 15 and a part thereof passes by means of pipe 16, pump 17 and pipe 18 into the reactor section of the packed column. The non-condensable gases comprise hydrogen chloride, together with fixed gases such as air which has been occluded or accidentally introduced with the materials entering the system. I have found that it is desirable to purge a certain fraction of the non-condensables at the point 19 in order to maintain the fixed gases at a minimum concentration in the system.

The volatile products leaving the dehydrator section 12 by means of pipe 13, for each 100 lbs. of finished product, will consist approximately as follows:

| | Pounds |
|---|---|
| Arsenic trichloride | 116.33 |
| $H_2O$ | 0.90 |
| HCl | 6.05 |

Upon cooling such a vaporized product to about 25° C. a liquid condensate readily separating into two layers will be obtained as follows:

| | Pounds |
|---|---|
| (A) Crude arsenic trichloride layer (heavy) | 115 |
| (B) Aqueous layer (light) | 1.6 |

The aqueous layer B contains the following ingredients:

| | Pounds |
|---|---|
| $H_2O$ | 0.86 |
| HCl | 0.61 |
| $As_2O_3$ | 0.13 |

Both A and B layers pass from condenser 14 by means of pipe 20 into separator 21 wherein a separation of the product into layers A and B occurs. By means of separator 21 aqueous layer B described above is decanted from the heavy arsenic trichloride layer and passes by means of pipe 22 into reactor 3.

The heavy arsenic trichloride layer A passes by means of pipe 23 into fractionating column 24. In this column a low boiling fraction, weighing approximately 10 lbs. per 100 lbs. of product is obtained as a head product, leaving the distilling column by means of pipe 25 and returning by this same means into reactor 3. A tails fraction weighing approximately 5 lbs. per 100 lbs. of product is discharged from the lower part of the fraction column 24 by means of pipe 26 and then by means of pipe 25 returns to the packed column 3. The product distilling within the limits of 130° C. to 133° C. at atmospheric pressure leaves column 24 by means of pipe 27, enters cooler 28 and is collected as the desired product at point 29.

Since the sulfuric acid used as a carrier for the $As_2O_3$ does not take part in the reaction, a withdrawal of acid from the system in amount equivalent to that added (but of lower concentration) is made, in order to maintain a substantially constant volume of acid in the system. The acid withdrawn by pipe 30 from the circulating acid in pipe 4 is substantially free of contained arsenic, the discharged acid, containing, when the process is properly operated, under 0.1% $As_2O_3$ and generally when employing an efficient scrubbing section under .0001% $As_2O_3$. The yield of $AsCl_3$ is accordingly substantially quantitative.

The by-product sulfuric acid may be disposed of for various chemical purposes, such as the acidulation of phosphate rock as for fertilizer manufacture. It may also be reconcentrated and reintroduced into the process. Various changes and modifications may be made in the process as described above, without departing from the bounds of my invention.

As an example of changes which may be made in the process, it is practical to choose a somewhat weaker feed acid, or a somewhat stronger acid than that specifically mentioned. Acids within the concentration range of 80% or 85% up to 95% or 100% or even oleum may be employed. When the concentration of the feed acid is changed, the concentration of the by-product acid will vary in a corresponding manner unless the quantity of feed acid is also changed. The employment of a more dilute acid than the 93% acid indicated in my preferred example, other things being equal, will cause somewhat more water vapor to be carried over with the $AsCl_3$ product leaving the dehydrator section than indicated above, and consequently produce a greater weight of aqueous condensate which may of course be separated in 21 and returned to the packed tower 3. The net effect of such a change is to vaporize larger quantities of water from the reactor, absorbing heat therefrom and transferring it to the cooling water in the condenser, resulting in a lowered reaction temperature in the reactor.

In the same manner, an increase in concentration of the sulfuric acid entering the reactor will permit less water to be vaporized and consequently cause a higher temperature in the reactor.

Further temperature control may of course be exercised either by the withdrawal or by the addition of heat to the reactor itself or to the reactants entering the same.

The amount of arsenous oxide employed in the acid may be varied somewhat from the 7% or 8% preferably employed so that as little as 2% or 3% to as much as 10% or 15% or even higher amounts—depending upon the production of a flowable slurry—may be used.

Although it is preferable to operate the process with packed columns for both the reactor section and the dehydrator section as described in the example above, fairly satisfactory results may be obtained by the use of a cascade system of liquid filled reaction vessels instead of packed columns. In this case, however, a larger proportion of aqueous layer must be recycled to the reaction zone.

In the event that packed columns are used it is very desirable that the column diameter as well as the size of the packing be properly designed for the production rate. This is especially true for the dehydrator section. The use of a dehydrator section of too great diameter or the use of packing of too large a size makes it necessary to recycle a larger proportion of aqueous layer. A fairly high downward velocity of the strong sulphuric acid is needed to insure a gradual increase in acid concentration as the top of the column is approached. It has been established that very satisfactory results may be obtained using 115 square inches cross section area for the reactor and scrubber sections for each 100 pounds hourly production and using 22 square inch cross sectional area for the dehydrator section for each 100 pounds hourly production. Naturally the height of the column depends on the size packing employed and on the desired elimination of water in the discharged acid and on the desired ratio of arsenic trichloride to aqueous layer in the vaporized discharge from the dehydrator. If 8 mm. packing is used, excellent results may be obtained with a column height of 5 to 7 feet for the combined reactor and scrubber sections and 2 to 3 feet for the dehydrator section. If larger packing is used, the column height must be increased in proportion to the decreased effectiveness of the larger packing in accord with usual engineering practice.

Condenser 14 and separator 21 may be replaced by a hot partial column condenser, and a satisfactory product obtained without redistillation.

Arsenites may be employed in the process instead of arsenous oxide. Arsenic oxide or arsenates may also be used provided that a reducing agent such as ferrous sulphate, which gives a non-volatile reaction product, is added simultaneously. Naturally the use of either arsenites or arsenates results in partial neutralization of the discharged acid.

In any process for the production of arsenic trichloride, it should be remembered that this product is an extremely hazardous material on account of its highly poisonous nature. It is poisonous not only when taken internally through the lungs or mouth, but also as a contact poison through the skin. There are statements in the literature to the effect that contact with the skin will cause death unless the affected area is washed immediately. Washing after five minutes is ineffective. Fortunately contact with water hydrolyzes $AsCl_3$ almost immediately into $As_2O_3$ and $HCl$. The $As_2O_3$ is merely a stomach poison.

The materials of construction for the apparatus may be carbon, glass, glass enameled iron, tantalum, gold or platinum.

What I claim is:

1. A process which comprises supplying a flowable slurry of arsenic trioxide and sulfuric acid to a reaction zone, flowing into said reaction zone a stream of hydrogen chloride gas, and producing thereby a reaction temperature sufficient to volatilize arsenic trichloride, thereupon passing said voltailized arsenic trichloride into contact with sulfuric acid substantially free of arsenic oxide and maintained at a temperature sufficiently high to prevent condensation of substantial amounts of said arsenic trichloride.

2. The process defined in claim 1, in which the slurry of arsenic trioxide is made with sulfuric acid containing in excess of 78% $H_2SO_4$ and the volatilized arsenic trichloride is contacted with a sulfuric acid having a strength greater than 85% $H_2SO_4$.

3. A process which comprises supplying a flowable slurry of arsenic trioxide in sulfuric acid to a reaction zone, flowing into said reaction zone a stream of hydrogen chloride gas at such a rate as to produce a temperature in said zone within the range of 140° C. to 150° C. and simultaneously to volatilize arsenic trichloride and water vapor therefrom, passing said volatilized arsenic trichloride and water vapor into contact with a sulfuric acid of a strength in excess of the acid employed in said slurry, and thereafter condensing said arsenic trichloride.

4. The process defined in claim 3 in which the arsenic trioxide-sulfuric acid slurry is made employing a sulfuric acid of about 78% concentration.

5. The process defined in claim 3, in which the volatilized arsenic trichloride and water vapor is contacted with a sulfuric acid of about 93% concentration.

6. A process for producing arsenic trichloride by reacting together arsenous oxide and hydrogen chloride comprising producing a slurry of white arsenic in a sulfuric acid solution, passing said slurry into a reaction zone, introducing into said reaction zone gaseous hydrogen chloride in amount affording an excess over that required to combine with said arsenic as arsenic trichloride, volatilizing arsenic trichloride together with a minor amount of water vapor from said sulfuric acid, passing said arsenic trichloride, water vapor and excess hydrogen chloride gas into contact with a sulfuric acid solution having a strength greater than said acid employed in said slurry, condensing arsenic trichloride and water vapor to form a two-layer separable liquid comprising an arsenic trichloride rich layer and an aqueous layer, and recovering arsenic trichloride from said arsenic trichloride rich layer.

7. A process for producing arsenic trichloride comprising producing a slurry of white arsenic in sulfuric acid solution, said solution containing about 78% $H_2SO_4$, and said slurry from 6% to 8% of $As_2O_3$, flowing said slurry into a reaction zone, introducing into said reaction zone gaseous hydrogen chloride in amount affording somewhat of an excess over that required to combine to form arsenic trichloride, withdrawing arsenic trichloride vapor from said zone together with a quantity of water vapor and excess hydrogen chloride gas, passing said arsenic trichloride vapor, water vapor and hydrogen chloride into contact with a sulfuric acid solution containing in the neighborhood of 93% $H_2SO_4$, withdrawing arsenic trichloride vapor from contact with said acid, condensing said arsenic trichloride vapor, and flowing said sulfuric acid solution into said reaction zone.

8. The process defined in claim 7, in which the introduction of the hydrogen chloride produces a temperature in the reaction zone sufficient to volatilize arsenic trichloride therefrom.

9. The process defined in claim 6 wherein the arsenic trichloride rich layer is subjected to fractional distillation to produce a substantially pure arsenic trichloride fraction, and a low and high boiling fraction which are returned to the reaction zone for further treatment.

10. The process defined in claim 6 wherein the aqueous layer separated from the arsenic trichloride rich layer is returned to the reaction zone for further treatment.

11. The process which comprises supplying a flowable mixture of arsenous oxide and sulfuric acid to a column reactor, reacting said arsenous oxide with gaseous hydrogen chloride and maintaining thereby a temperature in excess of 120° C. in said column and simultaneously volatilizing therefrom arsenic trichloride, said mixture and said hydrogen chloride being passed through said column countercurrently with respect to each other.

12. The process which comprises supplying a flowable mixture of arsenous oxide and sulfuric acid to a packed tower, reacting said arsenous oxide with gaseous hydrogen chloride and maintaining thereby a temperature in excess of 120° C. in said tower and simultaneously volatilizing therefrom arsenic trichloride, said mixture and said hydrogen chloride being passed through said tower countercurrently with respect to each other.

13. The process which comprises supplying a flowable slurry of arsenous oxide and sulfuric acid to a reaction zone, reacting said arsenous oxide with gaseous hydrogen chloride and maintaining thereby a temperature in excess of 120° C. in said zone and simultaneously volatilizing arsenic trichloride and water vapor therein, said slurry and said hydrogen chloride being passed through said zone countercurrently with respect to each other, whereby a substantial amount of said water vapor is removed from said volatilized arsenic trichloride prior to leaving said reaction zone by intimate contact with said slurry being supplied to said reaction zone.

14. The process which comprises supplying a flowable slurry of arsenous oxide and sulfuric acid to a reaction zone and flowing into said reaction zone a countercurrent stream of gaseous hydrogen chloride at such a rate as to produce in said zone a temperature in excess of 120° C. and simultaneously volatilizing arsenic trichloride therefrom, said arsenous oxide constituting at least 2% by weight of said slurry.

CHARLES F. BOOTH.